United States Patent [19]
Sakamoto et al.

[11] 3,938,912
[45] Feb. 17, 1976

[54] HORIZONTAL TYPE HYDROHOIST

[75] Inventors: Masakatsu Sakamoto, Matsudo; Kenji Uchida, Kashiwa; Makoto Saito, Tokyo; Yasunori Yamada, Yokohama; Yoshiyuki Takenaka, Kamakura, all of Japan

[73] Assignees: Hitachi, Ltd.; Showa Denko K.K.; Hitachi Sanki Engineering Co., Ltd., France

[22] Filed: Mar. 1, 1974

[21] Appl. No.: 447,357

[30] Foreign Application Priority Data
   Mar. 2, 1973   Japan.............................. 48-25887

[52] U.S. Cl................. 417/339; 417/392; 417/900
[51] Int. Cl.².................... F04B 17/00; F04B 35/00
[58] Field of Search............ 417/392, 339, 344–346, 417/900, 393; 137/13, 268, 802

[56] References Cited
UNITED STATES PATENTS

| | | | |
|---|---|---|---|
| 2,196,959 | 4/1940 | Crothers | 417/392 |
| 2,673,525 | 3/1954 | Lucas | 417/395 |
| 2,704,034 | 3/1955 | Jones | 417/390 |
| 3,306,216 | 2/1967 | Warman | 417/92 |
| 3,556,682 | 1/1971 | Sakamoto et al. | 417/122 |
| 3,630,638 | 12/1971 | Huso | 417/392 |
| 3,665,954 | 5/1972 | McNeal et al. | 137/268 |
| 3,731,701 | 5/1973 | Sugeno | 137/268 |

*Primary Examiner*—Carlton R. Croyle
*Assistant Examiner*—O. T. Sessions
*Attorney, Agent, or Firm*—Craig & Antonelli

[57] ABSTRACT

There is disclosed a horizontal type hydrohoist, in which slurry is forced to feed under lower pressure into feed pipes which are connected to a transport pipeline at their one ends and to a high pressure clear water pump at the others, said pump being adapted to deliver clear water under a high pressure, after which clear water is transferred under a high pressure through said feed pipe from said high pressure clear water pump, thereby transferring said slurry. This hydrohoist system presents the provision of means for preventing mixing and its spreading at the boundary portion between slurry and water within the feed pipes. More particularly, a separator which is designed not to rotate during the transfer is inserted in the aforesaid boundary portion in a manner that the separator may be transferred together with fluid, thus preventing the mixing of water with slurry as well as the resultant spreading thereof. According to a further aspect of the invention, at the completion of the slurry transfer under a high pressure, the separator is caused to be gradually slowed down to stop for the purpose of obviating a water hammer phenomenon within the pipings. In addition, after the removal of the slurry remaining around the separator by using a high pressure water, the feeding of the high pressure water is interrupted, thereby preventing mixing and its spreading at the boundary portion of water with slurry at the time of the subsequent introduction of slurry under lower pressure.

13 Claims, 16 Drawing Figures

FIG. 12(a) FIG. 12(b)
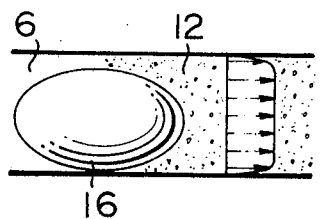
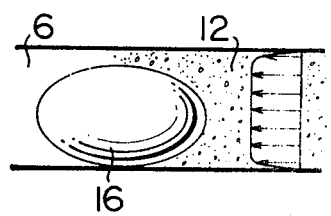
FIG. 13
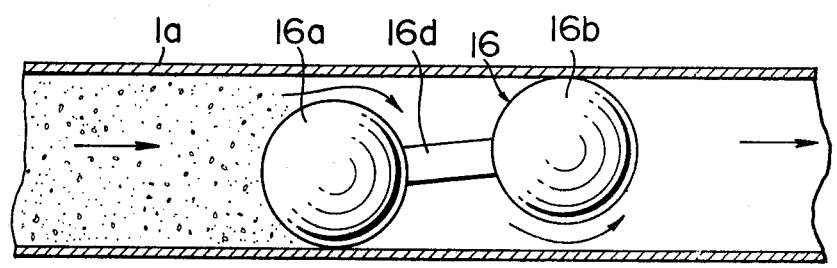
FIG. 14
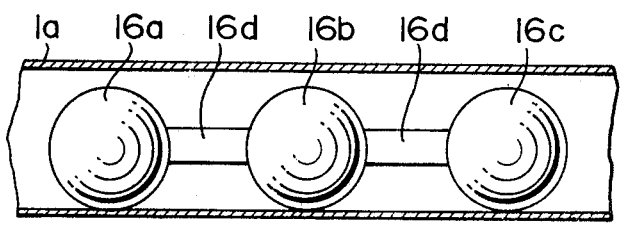

HORIZONTAL TYPE HYDROHOIST

This invention relates to a horizontal type hydrohoist adapted for use in transportation of solid particles by using water.

FIG. 1 shows one example of the prior art, of a horizontal type hydrohoist.

At the opposite ends of a plurality of parallel feed pipes 1a, 1b, 1c, there are provided drive liquid side change over valves 2a, 2b, 2c and transport pipe side change over valves 3a, 3b, 3c. Connected by way of a piping 4 to the inflow sides of the valves 2a, 2b, 2c on one side is a pump 7 which is adapted to deliver a drive liquid 6 to each feed pipe, while a transport pipe 8 is connected to the outflow sides of the valves 3a, 3b, 3c.

On the other hand, a slurry pump 13 is connected to the inflow sides of the other valves 3a, 3b, 3c, said pump being adapted to supply slurry within a tank to each feed pipes by way of slurry feed side valves 9a, 9b, 9c and a piping 10. On the other hand, a return piping 15 is connected to the outflow sides of the valves 2a, 2b, 2c, said return piping 15 being adapted to return the drive liquid 6 within each feed pipe to a tank 5 by way of drive liquid return side valves 14a, 14b, 14c.

Thus, for transferring the slurry 12 under pressure a transport pipeline 8, the drive liquid side valves 2a, 2b, 2c and transport pipe side valves 3a, 3b, 3c are first closed, while the drive liquid return side valves 14a, 14b, 14c and slurry feed side valves 9a, 9b, 9c are then opened, whereupon the slurry pump 13 is operated to feed the slurry 12 within the tank 11 to the feed pipes 1a, 1b, 1c. The feed of the slurry 12 causes the drive liquid within the feed pipes to return by way of the return spring 15 to the tank 5. When the feed pipes are filled with slurry 12, the drive liquid return side valves 14a, 14b, 14c as well as slurry feed side valves 9a, 9b, 9c are closed. Then drive liquid feed side valves 2a, 2b, 2c are transport pipe side valves 3a, 3b, 3c are opened.

This causes the drive liquid 6 to be fed to each feed pipe, and then slurry 12 is fed to the transport pipe 8.

Upon completion of feed of slurry in the feed pipes, the drive liquid feed side valves 2a, 2b, 2c and transport pipe valves 3a, 3b, 3c are closed, and on the other hand, drive liquid return side valves 14a, 14b, 14c are opened, thus repeating the above cycle.

In this respect, the opening and closing operations of each valve in feed pipes are accomplished according to a suitable timing cycle, and the aforesaid operations are repeated alternately for each feed pipes, thereby continuously operating the high pressure pump 7 and slurry pump 13 for continuous transfer of slurry.

The most important problem experienced with the aforesaid conventional horizontal type hydrohoist are that, upon transfer of slurry through the feed pipes, the speed distribution of slurry will be as shown in FIG. 2(a), and that when slurry enters the feed pipes, the speed of slurry will be as show in FIG. 2(b), whereby the boundary between the slurry and the drive liquid becomes obscure or not clear, with the resultant enlarged mixing zone of the slurry and the drive liquid. If the mixing zone is spread to further extent, then the slurry will become contained in the drive liquid which is being transferred through the return piping 15, when slurry is forced into feed pipes. This results in loss of transport efficiency and in wear in the wearing portions of the high pressure pump 7, when the slurry flows therethrough, thus lowering the function of the pump materially or causing binding or seizure of slurry, at valves.

It is accordingly the first object of the invention to provide a horizontal type hydrohoist, wherein there are provided within feed pipes separators adapted to be fed by means of drive liquid and slurry, thereby the spreading tendency of the mixing zone of slurry and drive liquid may be prevented.

It is the second object of the invention to provide a horizontal type hydrohoist, in which there are provided projecting type stoppers within feed pipes, whereby parts or the whole bodies of the separators are rested along the internal upper walls of the pipes, such that the slurry below the separators are swept or cleaned by drive liquid to thereby prevent spreading tendency of the mixing zones of slurry and drive liquid.

It is the third object of the invention to provide a horizontal type hydrohoist, in which there is provided electromagnetic stoppers sidewise of the outer peripheries of feed pipes, whereby energizing of stoppers causes parts or the whole bodies of the separators to stop or rest along the internal upper walls of pipes, thereby preventing spreading of the mixing zones of slurry and drive liquid, while avoiding impact of the separators acting on the stoppers.

FIG. 1 is an outline of a conventional horizontal type hydrohoist;

FIGS. 2(a) and (b) are plots representing speed-distribution of slurry according to the conventional hydrohoist;

FIG. 12 to FIG. 14 show embodiments of the separators of a horizontal type hydrohoist according to the invention, in which FIGS. 12(a) and (b) refer to a separator of a spheriodal body having a density greater than that of the liquid, FIG. 13 refers to a separator consisting of two spherical bodies inter connected by a connecting shaft, one of said bodies having a density greater than that of the liquid and the other having a density smaller than that of the liquid and FIG. 14 refers to a separator consisting of three spherical bodies connected in series by connecting shafts.

Description will now be given to one embodiment of the invention with reference to FIGS. 3 and 4.

Figure 1:
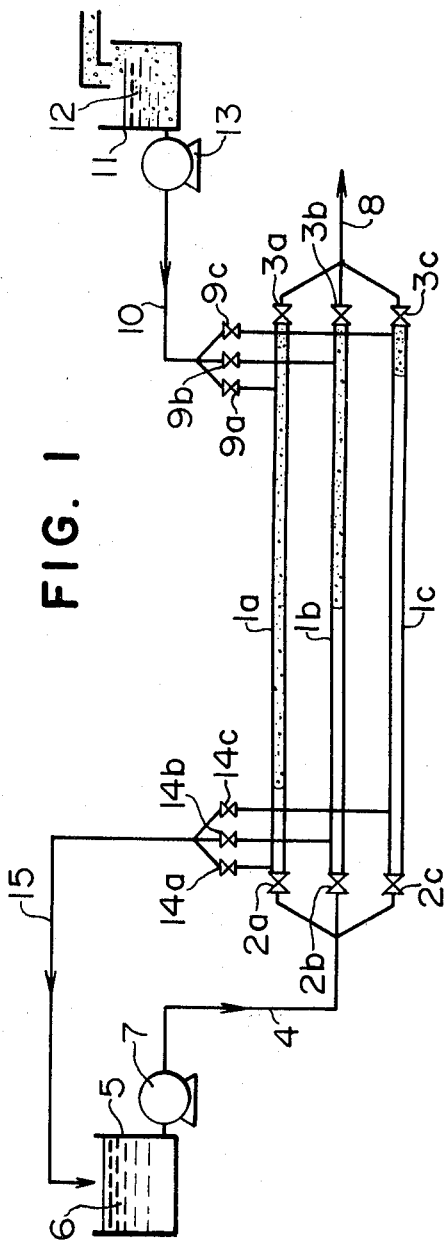
Figure 2B:
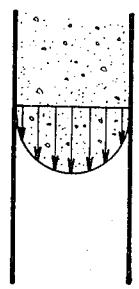
Figure 2A:
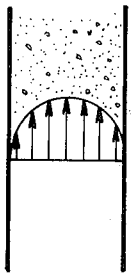
Figure 3:
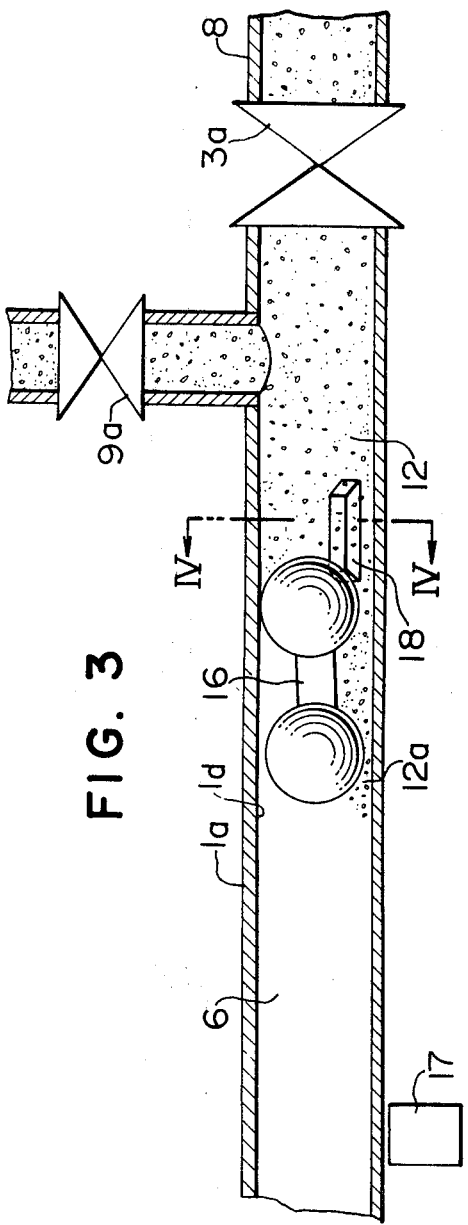
FIG. 3 is an enlarged cross-sectional view showing the essential part of one embodiment of the invention, illustrating projection type stoppers.
Figure 4:
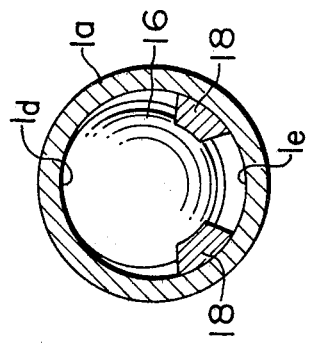
FIG. 4 is a cross-sectional view taken along the line IV—IV of FIG. 3.

FIG. 3 shows an enlarged view of the essential part of the horizontal type hydrohoist according to the present invention, while the like parts are designated like numbers in FIG. 1 and thus duplicate description will be omitted on such commonly used reference numerals. A transport pipe side valve 3a is connected to one end of a feed pipe 1a, while a transport pipe 8 is connected to the outflow side of the transport pipe side valve 3a, and a slurry pump (not shown) is connected by way of a slurry feed side valve 9a to the inflow side of the transport pipe side valve 3a, said slurry pump being adapted to supply slurry to the feed pipe 1a. There is provided a separator 16 in the feed pipe 1a, and detailed description will be had on the separator 16 hereinafter. The separator 16 is inserted in or adjacent to the boundary portion of a drive liquid 6 and slurry 12. A pair of detectors are provided on the transversely opposite side of the feed pipe, one on the left side (not shown) and the other 17 on the right, respectively, said detectors being adapted to detect the approach of a separator.

When the detector 17 on the right side, that is, adjacent to the valve 7a detects the presence of the separator 16, the drive liquid feed side valve (not shown) and the transport pipe side valve 3a will be closed halfway for a given period of time and then fully closed. Positioned in a piping in the range covering between the detector 17 and the transport pipe side valve 3a is a stopper 18 which is provided in projecting relation from the internal wall surface of the pipe 1a.

The stopper 18 is located in such a position where, when the separator 16 is detected at the detector 17 and then drive liquid feed side valve (not shown) and transport side valve 3a will thereby begin closing, thus the flow speed of the liquid in the piping is gradually slowed down so as to permit the separator to softly impinge on the stopper 18, i.e., in an attempt to prevent the water hammer created due to the sharp pressure rise in the piping. During the feed of slurry, the separator moves through the feed pipe 1a at the same speed as those of slurry 12 and drive liquid 6 and then impinges on the sloped surface of the stopper 18 in the vicinity of the transport pipe side valve, whereby part or the whole body of the separator 16 will slide along the internal upper wall surface 1d of the pipe to stop. Even after stopping of the separator 16, the drive liquid side valve and transport pipe side valve will remain in halfway-closed condition for a given period of time, while the drive liquid 6 flows along the internal lower wall surface of the piping and underside of the separator, being accelerated, thereby excluding the slurry remaining in the neighborhood of the separator along the internal bottom wall of the pipe.

Figure 5:
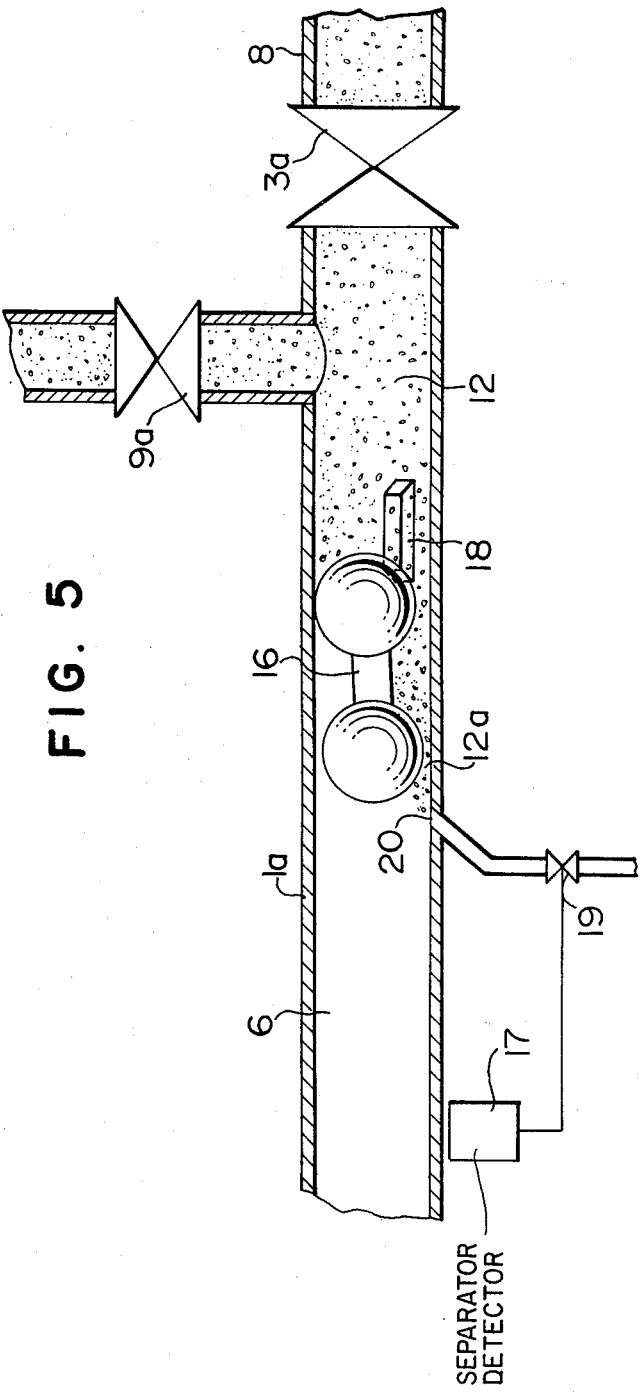
FIG. 5 is an enlarged cross-sectional view showing the essential part of another embodiment of a horizontal type hydrohoist of the invention; illustrating projection type stoppers and injection ports provided in the internal bottom walls of pipes.

FIG. 5 shows another embodiment of a horizontal type hydrohoist according to the present invention, and the like parts bearing the like reference numerals will be omitted of the description hereinafter.

There is provided an injection port 20 of the high pressure liquid through the internal bottom wall of the pipe in the range covering between the detector 17 provided sidewise of the outer periphery of a feed pipe 1a for detecting a separator and the stopper 18, said injection port 20 being in communication with a high pressure source by way of a high pressure valve 19.

When the separator 16 is decelerated and impinges on the stopper 18 to stop, the high pressure valve 19 will be opened, whereupon the high pressure liquid (normally the same as the drive liquid) will be injected through the injection port 20 therein, thereby forcing the remaining slurry together with the drive liquid 6 toward the transport pipe 8, thereby improving cleaning efficiency.

Figure 6:
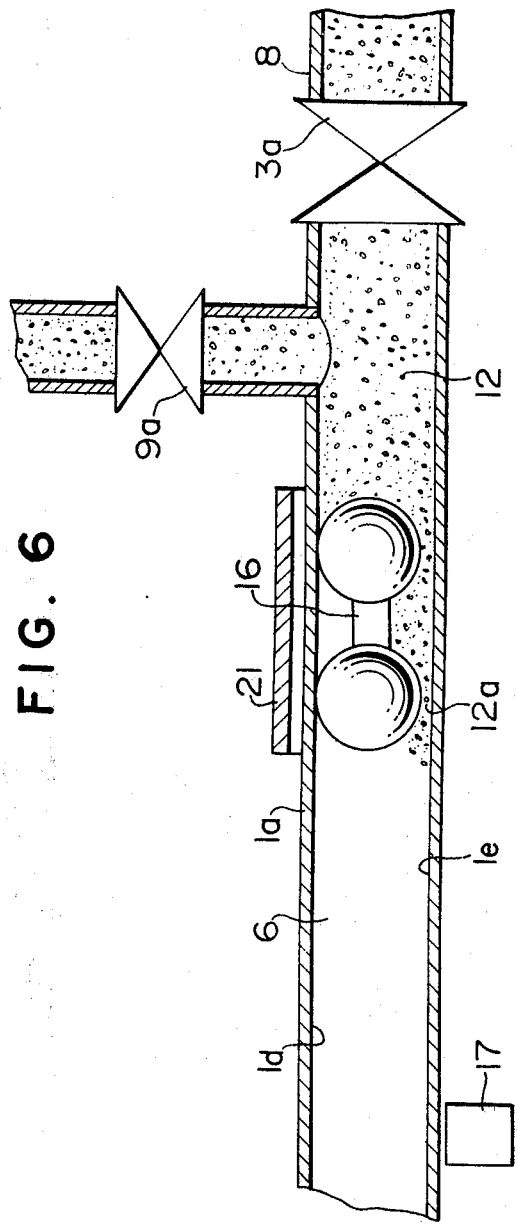
FIG. 6 is an enlarged cross-sectional view of the essential part of a further embodiment of a horizontal type hydrohoist of the invention, illustrating stoppers which may be electromagnetically operated.

FIG. 6 shows a still further embodiment of the invention, in which like parts designate like reference numerals, thereby omitting duplicate description.

Provided sidewise of the outer periphery of the feed pipe 1a but in the range covering from the detector 17 for separator 16 provided in like manner to the transport pipe side valve 3a is an electromagnetic stopper 21. When the separator 16 is detected at the detector, during the transfer of slurry, then the stopper 21 will be energized for a given period of time, whereby the separator 16 will be attracted to the internal upper wall 1d of the pipe to stop. Even after the stop of the separator 16, the drive liquid side valve (not shown) and transport pipe side valve 3a remain opened halfway for a given period of time, while the drive liquid 6 will flow through the gap between the underside of the separator and the internal bottom wall 1e of the pipe, and at the same time, the remaining slurry 12a will be forced toward the transfer piping 8. Then, after cleaning, the drive liquid side valve and transport pipe side valve 3a will be completely closed.

Figure 7:
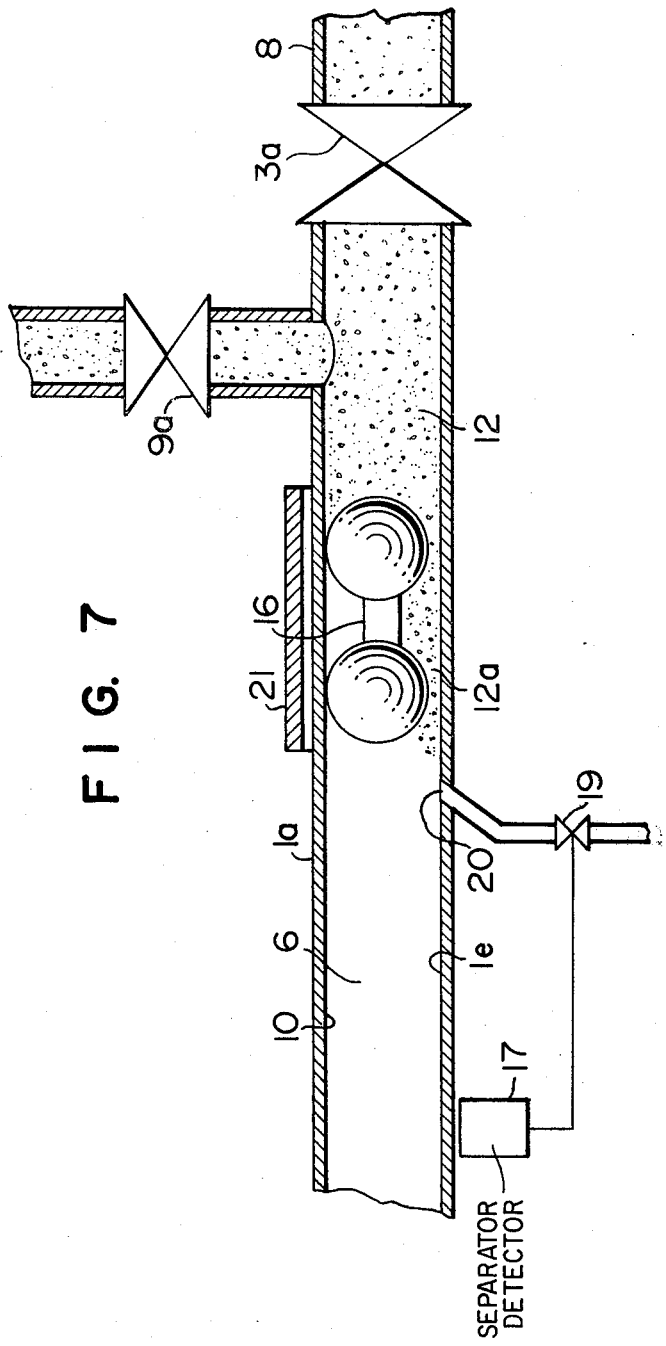
FIG. 7 is an enlarged cross-sectional view of the essential part of a still further embodiment of the invention, illustrating electromagnetic stoppers and injection ports provided in the internal bottom walls of pipes.
Figure 8:
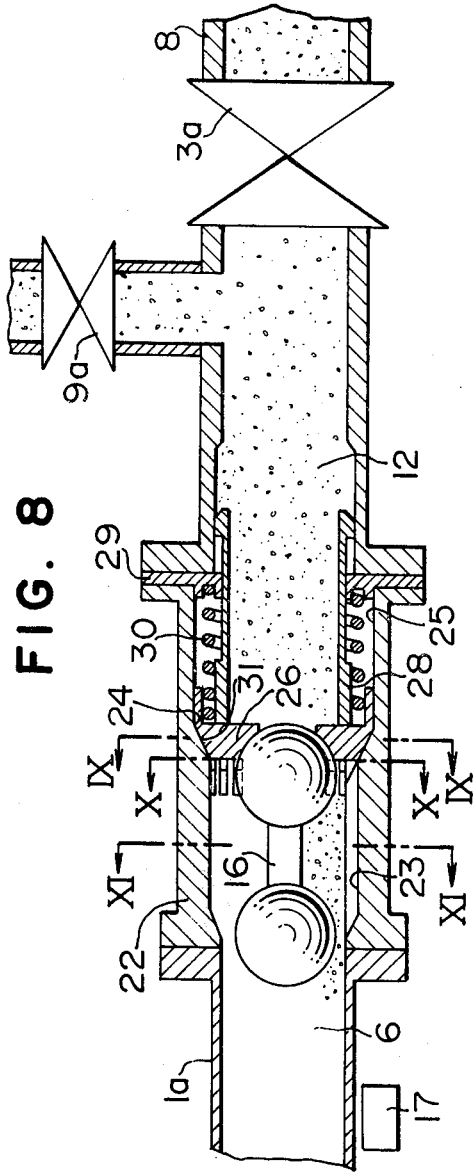
FIG. 8 is an enlarged cross-sectional view of the essential part of a yet further embodiment of a horizontal type hydrohoist of the invention, illustrating stoppers having a spring.

FIG. 7 shows a still further embodiment of the present invention, in which, like in other embodiments, like parts are designated like reference numerals, thereby omitting duplicate description.

The injection port 20 which communicates by way of the high pressure valve 19 with a high pressure source is provided through the internal bottom wall of the pipe in the range covering from the detector 17 for a separator to the stopper 21 which functions electromagnetically.

The separator 16 is attracted to the internal upper wall of the pipe by the stopper 21 energized, to stop. Even after the stoppage of the separator, the drive liquid side valve (not shown) and transport pipe side valve 3a maintain the halfway closed condition, such that the residual slurry 12a will be forced toward the transport pipe and cleaned by means of the drive liquid 6 passing through the gap defined between the underside of the separator 16 and the internal bottom wall 1e of the pipe as well as the hydraulic pressure due to the high pressure liquid from the injection port 20 in the internal bottom wall 1e of the pipe.

FIGS. 8 to 11 show a still further embodiment of the invention. A separating pipe 22 has a small diameter portion 23 having a diameter larger than the inner diameter of the feed pipe, 1a tapered portion 24 and a large diameter portion 25, the end on the small diameter side thereof being connected to the feed pipe 1a and the end on the large diameter side thereof being connected by way of slurry feed side valve 9a to a slurry pump (not shown) as well as by way of transport pipe side valve 3a to the transfer piping 8, respectively. Fitted in the large diameter portion 25 is a stopper 26 for the stopper 16 which is formed with a plurality of pawl portions 27 adapted to engage the separator 16, as show in FIG. 9 and has a stroke ring 28 welded thereto.

Figure 11:
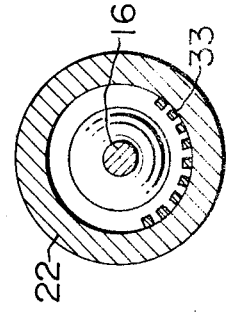
FIG. 11 is a cross-sectional view taken along the line XI—XI of FIG. 8.
Figure 10:
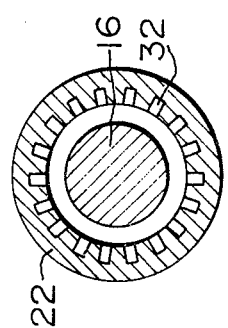
FIG. 10 is a cross-sectional view taken along the line X—X of FIG. 8.
Figure 9:
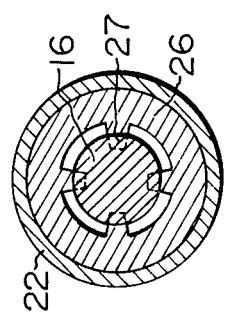
FIG. 9 is a cross-sectional view taken along the line IX — IX of FIG. 8.

Interposed between the stopper 26 and a holding plate 29 is a spring 30 in extensible relation, and the spring 30 is maintained in an maximum extended condition in the normal condition, with the tapered portion 31 for the stopper being in contact with the tapered portion 24 of the separating pipe. The tapered portion 24 adapted to contact the tapered portion 31 of the stopper is formed with a plurality of radially extending prooves 27 as shown in FIG. 10, which prevents interposition of the slurry in that portion. On the other hand, a plurality of separator guides 33 are formed in the internal bottom wall of the feed pipe 1a so as to give smooth sliding surfaces for the separator, as shown in FIG. 11.

When the detector 17 detects the approach of the separator moving from the left at the same speed of that of drive liquid 6 and slurry 12, then the valve (not shown) for supplying drive liquid 6 as well as the valve 3a are both maintained in halfway closed conditions for a given period of time, such that the flow speed of the liquid in the pipe will be decelerated, whereupon the separator 16 will abut on the stopper 26 to stop. Even after the stoppage of the separator 16, the drive liquid within the pipe will keep flowing, such that the residual slurry in the neghborhood of the separator 16 will be forced toward the transfer piping 8 by means of the drive liquid 6 to be cleaned, after which the aforesaid valves will be closed, respectively.

The fluid which is flowing in a full condition through the piping meets with the small diameter portion having a larger cross sectional area than that of the feed pipe, whereby the pressure of the fluid will be decreased, while the internal volume of the large diameter portion 25 will be increased due to the biasing of the stopper 26, thereby preventing the generation of water hammer phenomenon.

FIG. 12 to FIG. 14 show one embodiment of the separator adapted for use in a horizontal hydrohoist of the present invention.

Shown in FIG. 12(a) and (b) is a separator 16 having an ellipse cross-section, said ellipse having a major axis larger than the inner diameter of the feed pipe and a minor axis smaller than the inner diameter of the pipe. In addition, the density of the separator 16 is somewhat greater than that of the drive liquid 6. Accordingly, when the separator is being transferred by and being carried on the drive liquid, the separator may move along the internal bottom wall of the pipe without rotation with respect to its advancing direction. In general, the suspending particles forming slurry are apt to be precipitated on the internal bottom wall of the pipe with the result that the flow speed of the slurry along the internal bottom wall is lower than that of the slurry in the other portion, thereby presenting flows in the form of separated layers at different flow speeds. However, the use of the aforesaid separator 16 avoids such disadvantages by presenting uniform flow through a pipe as shown in FIG. 12(a) and 12(b), because the separator 16 moves along the internal bottom wall of the pipe in contact relation, thereby accelerating the flow along the bottom wall, which tends to stagnate. As a result, this minimizes the spreading of the mixing zone of slurry and drive liquid.

A separator as shown in FIg. 13 consists of two spherical bodies 16a and 16b interconnected by a connecting shaft 16d to thereby prevent the turnover in the advancing direction thereof, while the density of one of the aforesaid two spherical bodies greater than that of the drive liquid and that of the other is smaller than that of the drive liquid.

This causes the separator to move in an inclined attitude through the pipe, such that one of the two spherical bodies maintains contact with internal upper wall of the pipe and the other maintains to contact the internal bottom wall thereof, whereby the mixing of the drive liquid with the slurry may be minimized.

A separator as shown in FIG. 14 consists of three spherical bodies connected in series relation by means of connecting shafts 16d, thereby preventing the turnover of the separator in its advancing direction. The provision of three gaps defined by the three spherical bodies and the internal wall of the pipe further minimizes the spreading tendency of the mixing zone of drive liquid and slurry.

The increase in number of the spherical bodies will necessarily result in the increase in number of gaps defined between the spherical bodies and the internal wall of the pipe, such that the spreading tendency of the mixing zone will be further minimized.

As is apparent from the foregoing description, the advantages and efficacies of the present invention are as follows:

1. The provision of a separator having a portion of a density greater than that of the drive liquid in the feed pipe aids in presenting uniform distribution of the speed of slurry, while the construction of the separator designed prohibits the turnover thereof in an advancing direction thereof, thus minimizing the spreading tendency of a mixing zone of drive liquid and slurry.

2. Part of the whole body of a separator stops along the internal upper wall of a pipe due to the presence of a projecting type stopper within the pipe, such that the residual slurry remaining along the internal bottom wall of the pipe may be excluded smoothly.

3. The provision of electromagnetic stopper prevents impact between the separator and the stopper, when impinged on each other, thereby minimizing the spreading tendency of a mixing zone of drive liquid and slurry.

4. The provision of enlarged cross-sectional area at the abutting portion of the separator on the stopper suppresses the generation of water hammer due to the sharp pressure rise in the fluid flowing through piping.

What is claimed is:

1. A horizontal type hydrohoist comprising:
a plurality of substantially cylindrical feed pipes arranged horizontally and in parallel relationship with respect to each other;
a drive liquid pump communicating with a drive liquid tank and connected at one end of said feed pipes by first valve means;
transport piping connected at the other end of said feed pipes by second valve means for transporting slurry under pressure;
a slurry pump communicating with a slurry tank and connected with said feed pipes by third valve means in the vicinity of said other end of said feed pipes;
return piping connected with said drive liquid tank and said feed pipes by fourth valve means in the vicinity of said one end of said feed pipes for returning the drive liquid in the feed pipes to said drive liquid tank by the slurry fed by said slurry pump;
separator means arranged in each of said feed pipes at the boundary portion between the slurry and the drive liquid so as to provide a small space between said separator means and the inner peripheral surface of said feed pipe;

and stopper means located at the portion of said feed pipes on the drive liquid feed side of the junction of said feed pipes and piping communicating said feed pipes with said slurry pump for stopping movement of said separator means such that one end of said separator means is lifted from the bottom of said feed pipes to permit drive liquid to pass under said separator means.

2. A horizontal type hydrohoist according to claim 1, wherein said stopper means comprises a projection disposed on the inner surface of said feed pipes at the bottom portion thereof to lift the separator means toward the upper portion of said feed pipes.

3. A horizontal type hydrohoist according to claim 2, wherein separator detecting means is located at the outer periphery of each end of said feed pipes for detecting said separator means reciprocally moving in said feed pipes and an injection port is provided at the drive liquid feed side upstream of said stopper means for feeding high pressure liquid through the bottom wall of said feed pipes to discharge slurry remaining around said separator means to the transport piping in response to a signal from the separator detecting means.

4. A horizontal type hydrohoist according to claim 1, wherein said stopper means comprise an electromagnetic stopper disposed at the outer periphery of said feed pipes to stop said separator means with at least one end of said separator means in an upper position in said feed pipes in order to provide a space between said separator means and the bottom surface of said feed pipes.

5. A horizontal type hydrohoist according to claim 4, wherein separator detecting means is located at the outer periphery of each end of said feed pipes for detecting said separator means reciprocally moving in said feed pipes and an injection port is provided at the drive liquid feed side upstream of said stopper means for feeding high pressure liquid through the bottom wall of said feed pipes to discharge slurry remaining around said separator means to the transport piping in response to a signal from the separator detecting means.

6. A horizontal type hydrohoist according to claim 1, wherein said stopper means include spring means for reducing the impact force caused by said separator means.

7. A horizontal type hydrohoist comprising:
a substantially cylindrical feed pipe being disposed horizontally;
transport piping means connected at one end of said feed pipe for transporting slurry in said feed pipe under pressure;
drive liquid supply means connected to the other end of said feed pipe for supplying drive liquid to discharge the slurry in said feed pipe to said transport piping means;
slurry supply means connected with said feed pipe at a first portion adjacent said one end for supplying the slurry into said feed pipe;
separator means movably arranged in said feed pipe at the boundary portions between the slurry and the drive liquid and formed to provide a small space between the inner peripheral surface of said feed pipe and said separator means; and
stopper means arranged at a second portion of said feed pipe upstream of said first portion for stopping said separator means such that at least one end of said separator means is lifted from the bottom surface of said feed pipe so as to provide a space therebetween.

8. A horizontal type hydrohoist according to claim 7, wherein said stopper means comprises a projection disposed on the bottom inner surface of said feed pipe.

9. A horizontal type hydrohoist according to claim 8, wherein said projection has a sloped surface at the upstream end thereof for guiding said separator means to the upper position of said feed pipe.

10. A horizontal type hydrohoist according to claim 8, further comprising an injection port disposed upstream of said stopper means through the bottom wall of said feed pipe for feeding a high pressure liquid to discharge the slurry remaining around said separator means to said transport piping means.

11. A horizontal type hydrohoist according to claim 7, wherein said stopper means comprises an electromagnetic means disposed on the upper side of the outer periphery of said feed pipe to attract said separator means to the upper side of the inner wall of said feed pipe.

12. A horizontal type hydrohoist according to claim 11, further comprising an injection port disposed through the bottom wall of said feed pipe upstream of said stopper means for feeding a high pressure liquid to discharge slurry remaining around said separator means to said transport piping means.

13. A horizontal type hydrohoist according to claim 7, wherein said stopper means comprises an annular stopper movably arranged in said feed pipe and having a plurality of pawl portions formed radially inward to engage with said separator means and spring means supporting said annular stopper to reduce the impact force caused by said separator means.

* * * * *